July 14, 1964 H. C. SCHROEDER 3,140,954
CONFECTION AND SUPPORT THEREFOR
Filed Feb. 28, 1962 2 Sheets-Sheet 1
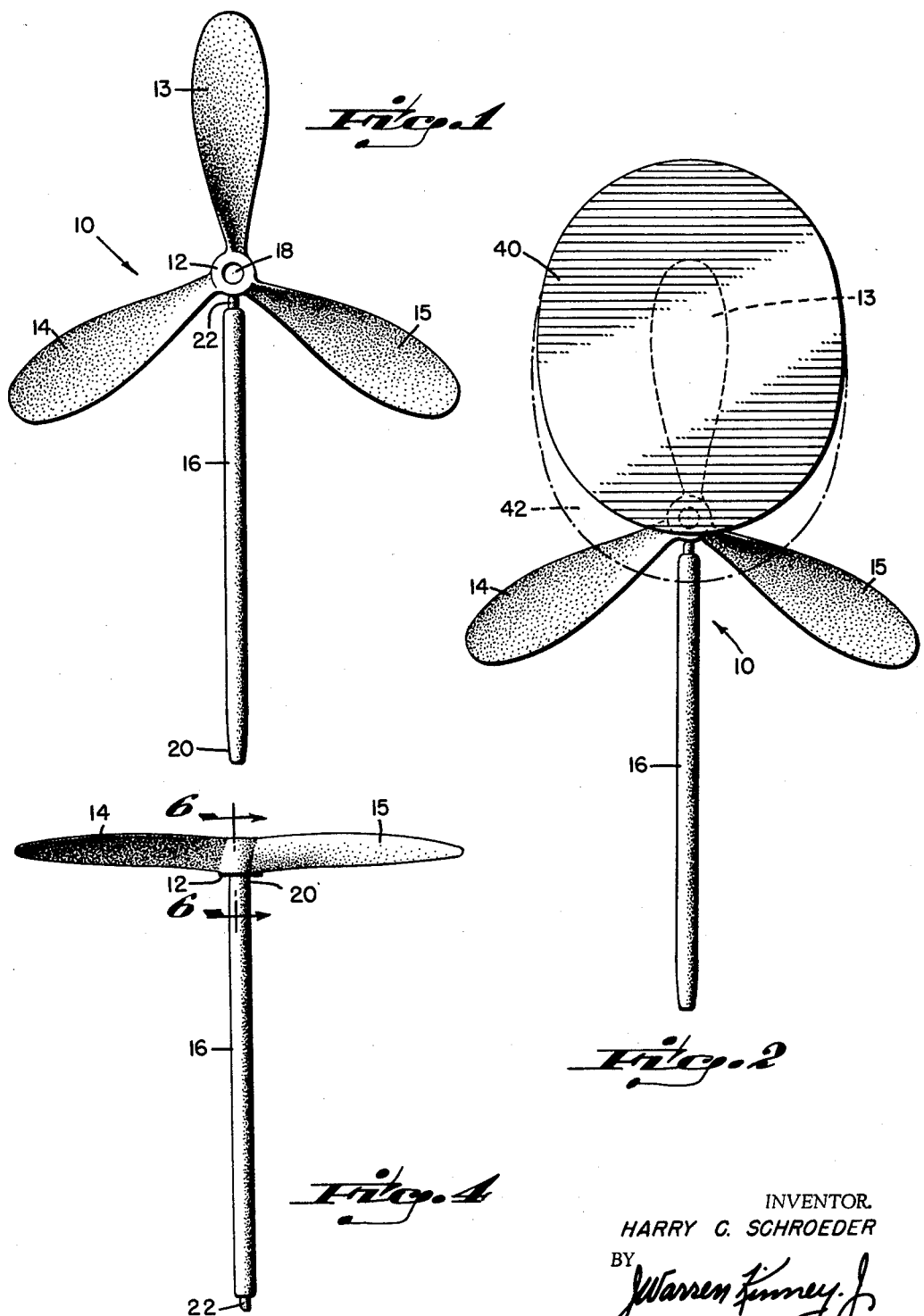
INVENTOR.
HARRY C. SCHROEDER
BY
Warren Kinney Jr
ATTORNEY July 14, 1964  H. C. SCHROEDER  3,140,954
CONFECTION AND SUPPORT THEREFOR
Filed Feb. 28, 1962  2 Sheets-Sheet 2
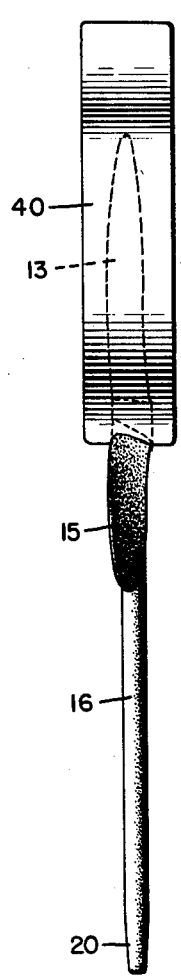
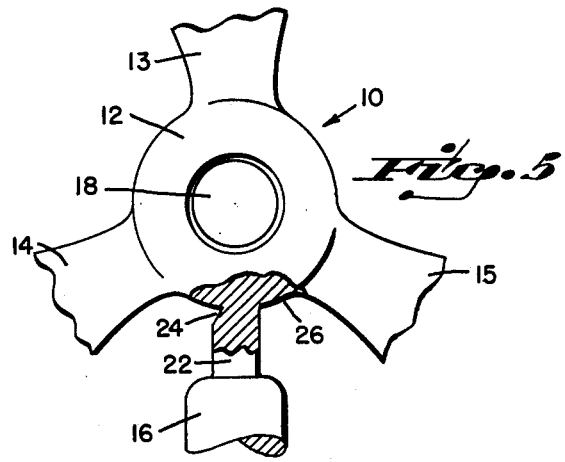
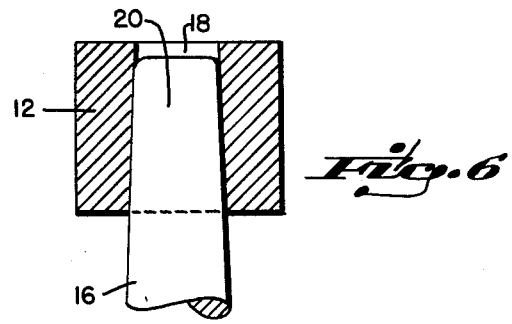
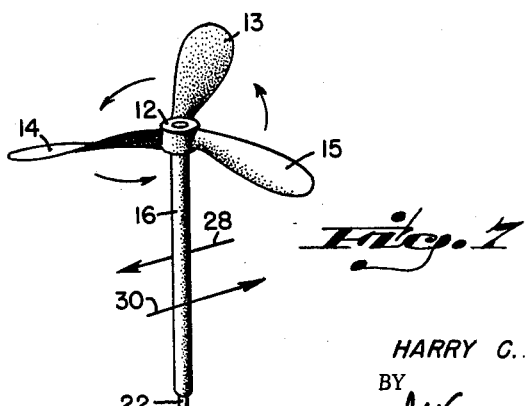
INVENTOR.
HARRY C. SCHROEDER
BY
*J Warren Kinney Jr.*
ATTORNEY

3,140,954
CONFECTION AND SUPPORT THEREFOR
Harry C. Schroeder, Cincinnati, Ohio, assignor to Plastic Specialties, Inc., Cincinnati, Ohio, a corporation of Ohio
Filed Feb. 28, 1962, Ser. No. 176,307
1 Claim. (Cl. 99—138)

This invention relates to a confection, and more particularly to a support member for an edible confection which may be used as a toy after the confection has been eaten or otherwise removed therefrom.

An object of the invention is to provide a support for an edible member or confection in the form of a three-bladed propeller having a handle formed integral with the hub thereof and secured thereto in such a manner as to permit easy separation of the handle from the hub by the application of a bending force thereto.

Another object of the invention is to provide a support member having the hereinabove described characteristics, which may be inexpensively fabricated from a suitable thermo-plastic material which may be utilized, without further processing, as a support for an edible confection.

Still a further object of the invention is to provide a support member for an edible confection which will impart to the confection supported thereby a unique and attractive appearance which will enable the purchasing public, and particularly children, to readily identify a confection having a support member which embodies the teachings of the present invention.

These and other objects are attained by the means described herein and as disclosed in the accompanying drawings, in which:

FIG. 1 is an elevational view of a support member embodying the teachings of the present invention.

FIG. 2 is an elevational view of a confection associated with the support member of FIG. 1.

FIG. 3 is a side elevational view of the device of FIG. 2.

FIG. 4 is a side view illustrating the manner in which the propeller blades and hub are associated with the handle portion of the support member of FIG. 1 to form a toy.

FIG. 5 is an enlarged fragmentary view, partly in section, of the connection between the handle member and hub of the propeller of the device of FIG. 1.

FIG. 6 is a sectional view taken on line 6—6 of FIG. 4.

FIG. 7 is a perspective view illustrating the device of FIG. 4 in use as a toy.

With particular reference to FIGS. 1, 2 and 5, the numeral 10 denotes generally a three-bladed propeller assembly comprising a central hub 12 from which three equally spaced propeller blades 13, 14, and 15 project. A handle 16 is formed integral with the hub, said handle being in axial alignment with blade 13 and projecting downwardly from the hub between blades 14 and 15.

Hub 12 is provided with an axial bore 18 which is normal to the axis of handle 16, said bore dimensioned to snugly receive the outer end 20 of handle 16. In the preferred embodiment of the invention, the outer or terminal end 20 of the handle is gradually tapered or reduced in diameter, as best ilustrated in FIGS. 1, 2, 3 and 6.

With particular reference to FIG. 5, the hub-adjacent end of handle 16 terminates in a reduced shank portion 22 which, in the preferred embodiment of the invention, is provided with a notch as at 24 adjacent the periphery 26 of hub 12 for defining a severance or cleavage zone at which the handle will be separated from the hub incident to the application of a bending force to the handle relative to the hub and blade assembly.

After the handle 16 has been detached from hub 12 and reversed, the terminal end 20 may be introduced into bore 18 of the hub for securely though releasably effecting a frictional connection between the handle and hub whereby the propeller blades and hub will be secured to and carried by the handle which then may be employed for, or function as, an axle shaft, as illustrated in FIGS. 4 and 7.

The propeller assembly may be readily rotated by the application of a turning force to the handle as the handle is rotated by reason of movement of the palms of a person's hands in the directions indicated by the headed arrows 28 and 30 of FIG. 7. Such spinning action will cause the entire propeller assembly to rise into the air, thereby providing a toy having interesting play value.

With particular reference now to FIGS. 2 and 3, the numeral 40 denotes generally an edible confection in which blade 13 and a portion of hub 12 is imbedded for providing a support therefor. The numeral 42 denotes an alternate manner in which a confection may be applied to the support member whereby to completely house blade 13, hub 12, and the hub-adjacent portions of blades 14 and 15.

It will be noted that when thus supported, portions of blades 14 and 15 will project downwardly and outwardly from the lower portion of the confection on opposite sides of the depending handle 16, whereby the overall appearances of the confection and the fact that the confection is supported on my unique propeller assembly will be readily evident to purchasers of the device.

It should be understood that various changes in the structural details of the device may be made, within the scope of the appended claim, without departing from the spirit of the invention.

What is claimed is:

A combined confection and toy article, the toy article having a portion imbedded in the confection for supporting the same, said article consisting in an initial one piece, of a propellor having a centrally apertured hub and at least three blades extending radially therefrom and an elongate member integral at one end with the hub and extending radially therefrom between two of the blades, the third blade being imbedded in the body of confection, said member being adapted to perform the double function of a handle for supporting the confection attached to said third blade and a rotating shaft for the propellor when joined to the hub of the latter after removal of the confection, the member being initially formed for the performance of the second mentioned function by having the said one end formed with a reduced relatively short and thin longitudinally extending shank, as compared to the length and thickness of the major portion, and the shank being weakened to be easily broken away from the hub, and the member having its other end shaped for frictional engagement in the aperture of the hub, when reversed after being broken away at the shank, to extend axially of the hub for use as a shaft to rotate the propellor.

References Cited in the file of this patent

UNITED STATES PATENTS

| | | |
|---|---|---|
| 1,586,137 | Zanath | May 25, 1926 |
| 1,895,697 | York | Jan. 31, 1933 |
| 1,936,816 | Zitzman | Nov. 28, 1933 |
| 2,233,640 | Pizzarelli | March 4, 1941 |
| 2,469,589 | Barricini | May 10, 1949 |